May 13, 1924.
V. W PAGÉ
1,494,281
SPRING SUSPENSION
Filed Jan. 10, 1922
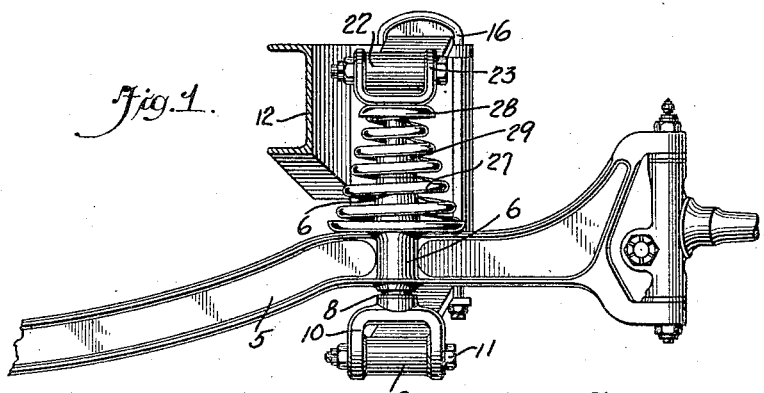
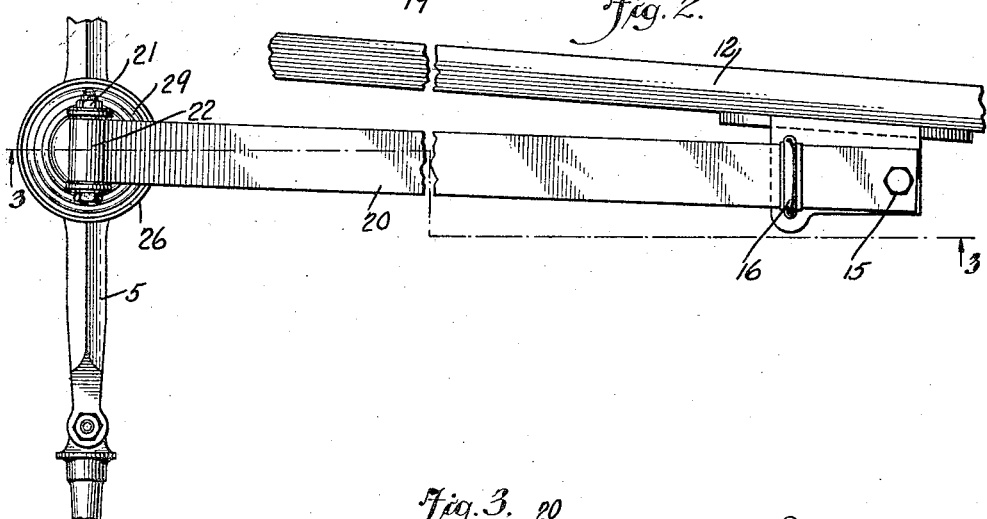
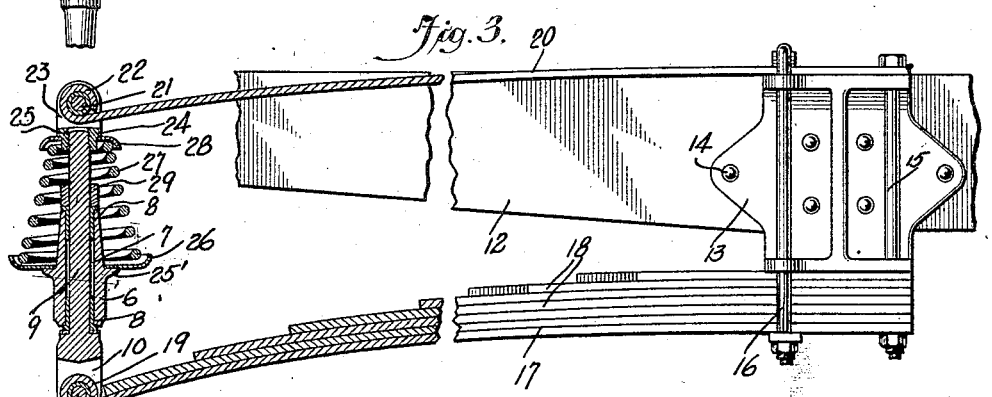
INVENTOR
VICTOR W. PAGÉ
BY
ATTORNEYS Patented May 13, 1924.

1,494,281

UNITED STATES PATENT OFFICE.

VICTOR W. PAGÉ, OF NEW YORK, N. Y.

SPRING SUSPENSION.

Application filed January 10, 1922. Serial No. 528,324.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Spring Suspension, of which the following is a full, clear, and exact description.

The present invention relates to new and useful improvements in vehicles, and it pertains more particularly to spring suspensions therefor.

The construction herein disclosed is an improvement over that shown in my co-pending application Serial Number 458,655, filed April 5, 1921.

It is one of the objects of the present invention to provide a new and improved means for resiliently supporting the forward end of a vehicle body from the forward axle of the machine.

It is a further object of the invention to construct a front spring suspension for vehicles so that a part of the resilient element serves as a radius rod for the front axle.

It is a further object of the invention to provide a plurality of independent springs, certain of which are inoperative under normal running conditions.

Reference is to be had to the accompanying drawings forming a part of this specification in which similar characters of reference indicate like parts in all the figures, and in which—

Figure 1 is a detail view partly in section and partly in elevation of one end of a front axle for motor vehicles showing the new and improved spring suspension in front elevation;

Fig. 2 is a top plan view of the device, partly broken away;

Fig. 3 is a view in elevation of the device, partly in section, the section being taken on the line 3—3 of Fig. 2.

Referring more specifically to the drawings, the reference character 5 designates the front axle, and said axle is provided at a point adjacent each of its ends with an enlarged portion 6, circular in cross section, and said enlarged portion 6 is provided with a passage 7 extending entirely through the axle, as clearly shown in Fig. 3. Mounted in this passage or opening 7 are bushings 8, and slidably mounted in the bushings 8 is a bolt or similar element 9, the lower end of which is bifurcated as indicated by the reference character 10, and connecting the furcations of the bifurcated portion is a bolt 11, the purpose of which will be hereinafter more specifically described.

The reference character 12 designates one of the side frames of the chassis, and secured to the side frame 12 at the desired point is a spring mount 13, said spring mount 13 being rigidly secured in place by means of rivets, bolts, or the like 14. Rigidly secured to the spring mount 13, as by a bolt 15 which passes through the ends of the leaves of the spring and by a clamping spring bolt 16, is a spring element 17 comprising a plurality of leaves 18. The lower leaf 18 of the spring element 17 has its forward end coiled about the bolt 11 as indicated by the reference character 19, and this construction provides for pivotally securing the forward end of the resilient element 17 to the bifurcated end 10 of the bolt 9.

Rigidly secured to the upper end of the spring mount 13 by the bolts 15 and 16 heretofore mentioned, is a resilient element 20, and said resilient element 20 comprises a single leaf, the forward end of which is coiled about a bolt 21, as indicated by the reference character 22. The bolt 21 is pivotally mounted between the ears 23 of a fitting 24, which fitting 24 has screw-threaded engagement as at 25 with the upper end of the sliding bolt 9. The axle 5 is provided with an annular flange 25' surrounding the enlarged portion 6 thereof, and mounted or supported upon said flange is a cup or similar member 26. Mounted upon this cup 26 and supported thereby is a coil spring 27, and the upper end of said coil spring 27 engages a cup 28 similar to the cup 26, the cup 28, however, being inverted and engaging the fitting 24. Mounted upon the top of the axle and within the coil spring 27, is a cushion block 29 of any suitable material, and this cushion block is adapted to be engaged by the fitting 24 upon reciprocatory movement of the bolt 9 within the axle.

The device operates in the following manner:

The weight of the body carried by the chassis is transferred through the resilient element 20 and to the coil spring 27, the coil spring 27 and the resilient element 20 supporting the weight under normal conditions, and the fulcrum of the spring suspension being the lower end of the coil spring where it engages the cup 26.

Under normal conditions, that is, when the load of the vehicle is sufficient to overcome the resilient action of the element 20 and the coil spring 27, the fitting 24, owing to the sliding movement of the bolt 9 in the axle 5, will engage the cushion block 29 and then will render the resilient element 20 and the coil spring 27 inoperative to support the vehicle body.

With the parts in this position, the resilient support of the vehicle body is taken care of by the resilient element 17 and the fulcrum of the suspension in this instance is the bolt 11, about which the forward end of the lower leaf of the resilient member 17 is coiled.

By this construction it is apparent that a spring suspension of a light character for supporting the body under normal conditions is had, and, at the same time, a spring suspension constructed in accordance with the present invention is capable of meeting abnormal conditions, such as inequalities in the road, overloading of the body, and the like.

While in the present instance but one form of the suspension has been shown and described, it is to be understood that a similar construction is employed on each side of a vehicle frame and while the device has been described as a front spring, it is obvious that the construction with slight modifications is applicable to a rear spring suspension as well.

I claim:

A front spring suspension for motor vehicles comprising in combination with the front axle of a vehicle, a bolt mounted for vertical sliding movement in the axle near its end, a spring connected at one of its ends to the side frame of the chassis, said spring extending longitudinally of the vehicle and connected at its forward end to the lower end of the said bolt, a second spring parallel to the first mentioned spring, said second mentioned spring being connected at its rear end to the chassis side frame and connected at its front end to said bolt mounted in the axle, said bolt serving as means for connecting the ends of the first and second mentioned springs, said bolt also serving to take the longitudinal thrust of the springs, and a coil spring surrounding said bolt and interposed between the axle and the upper end of the bolt, substantially as set forth.

VICTOR W. PAGÉ.